(No Model.) 4 Sheets—Sheet 1.

G. W. RODECAP.
TRICYCLE.

No. 376,551. Patented Jan. 17, 1888.

Fig. 1

WITNESSES:
C. Neveux
C. Sedgwick

INVENTOR:
G. W. Rodecap
BY Munn & Co.
ATTORNEYS.

N. PETERS, Photo-Lithographer, Washington, D. C.

(No Model.) 4 Sheets—Sheet 2.

G. W. RODECAP.
TRICYCLE.

No. 376,551. Patented Jan. 17, 1888.

WITNESSES:
C. Neveux
C. Sedgwick

INVENTOR:
G. W. Rodecap
BY Munn &Co
ATTORNEYS.

(No Model.) 4 Sheets—Sheet 3.

G. W. RODECAP.
TRICYCLE.

No. 376,551. Patented Jan. 17, 1888.

WITNESSES:
C. Neveux
C. Sedgwick

INVENTOR:
G. W. Rodecap
BY Munn & Co
ATTORNEYS.

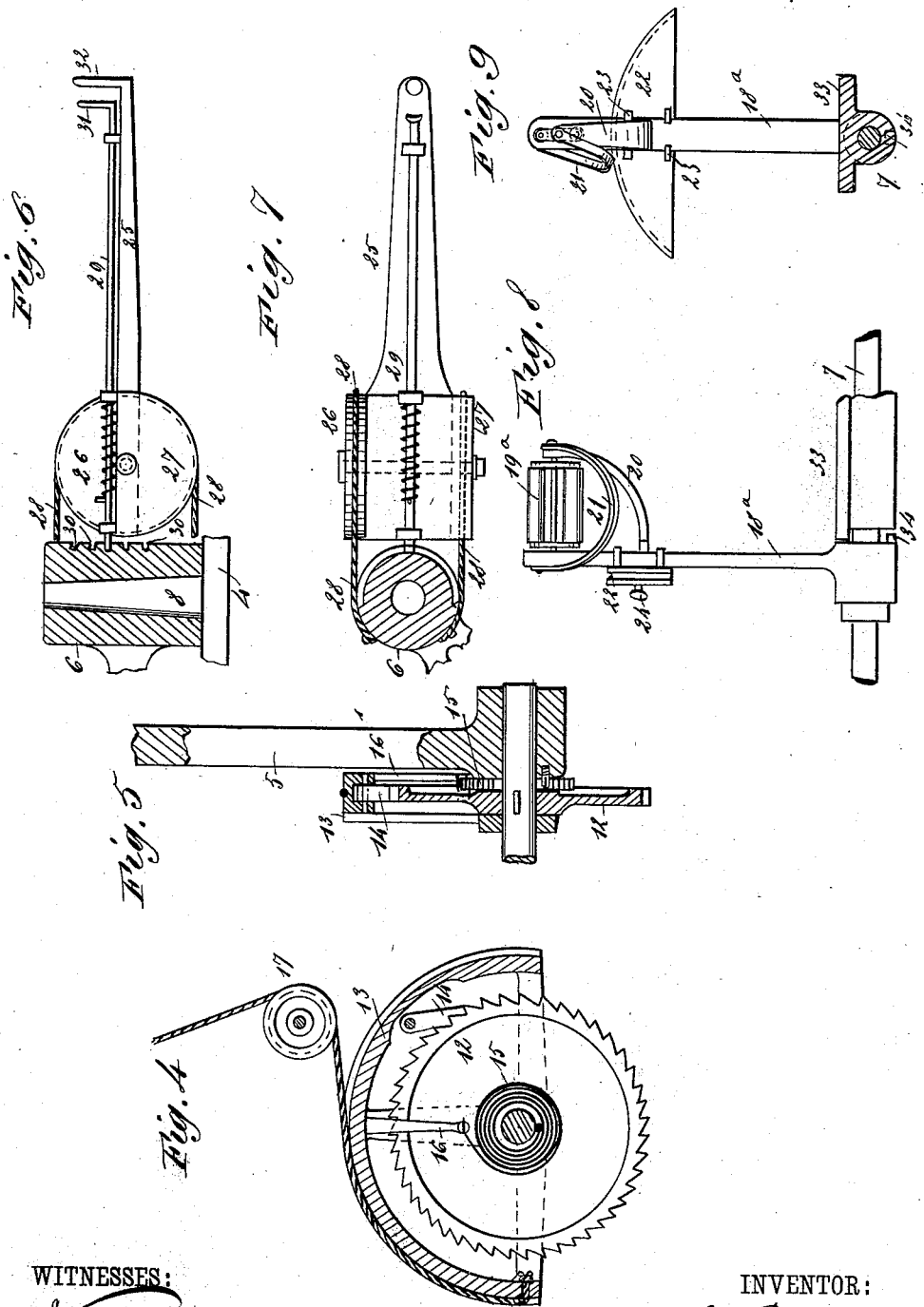

UNITED STATES PATENT OFFICE.

GEORGE W. RODECAP, OF MIDDLETOWN, INDIANA.

TRICYCLE.

SPECIFICATION forming part of Letters Patent No. 376,551, dated January 17, 1888.

Application filed May 20, 1887. Serial No. 238,837. (No model.)

*To all whom it may concern:*

Be it known that I, GEORGE W. RODECAP, of Middletown, in the county of Henry and State of Indiana, have invented a new and Improved Tricycle, of which the following is a full, clear, and exact description.

My invention relates to an improvement in tricycles, and has for its object to provide a tricycle of simple and durable construction, in which the power is applied to the wheels through the medium of treadles in an easy manner and with great regularity, and wherein the tricycle may be steered in any direction and the pivot-wheel be quickly turned at any angle with relation to the frame.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 2:
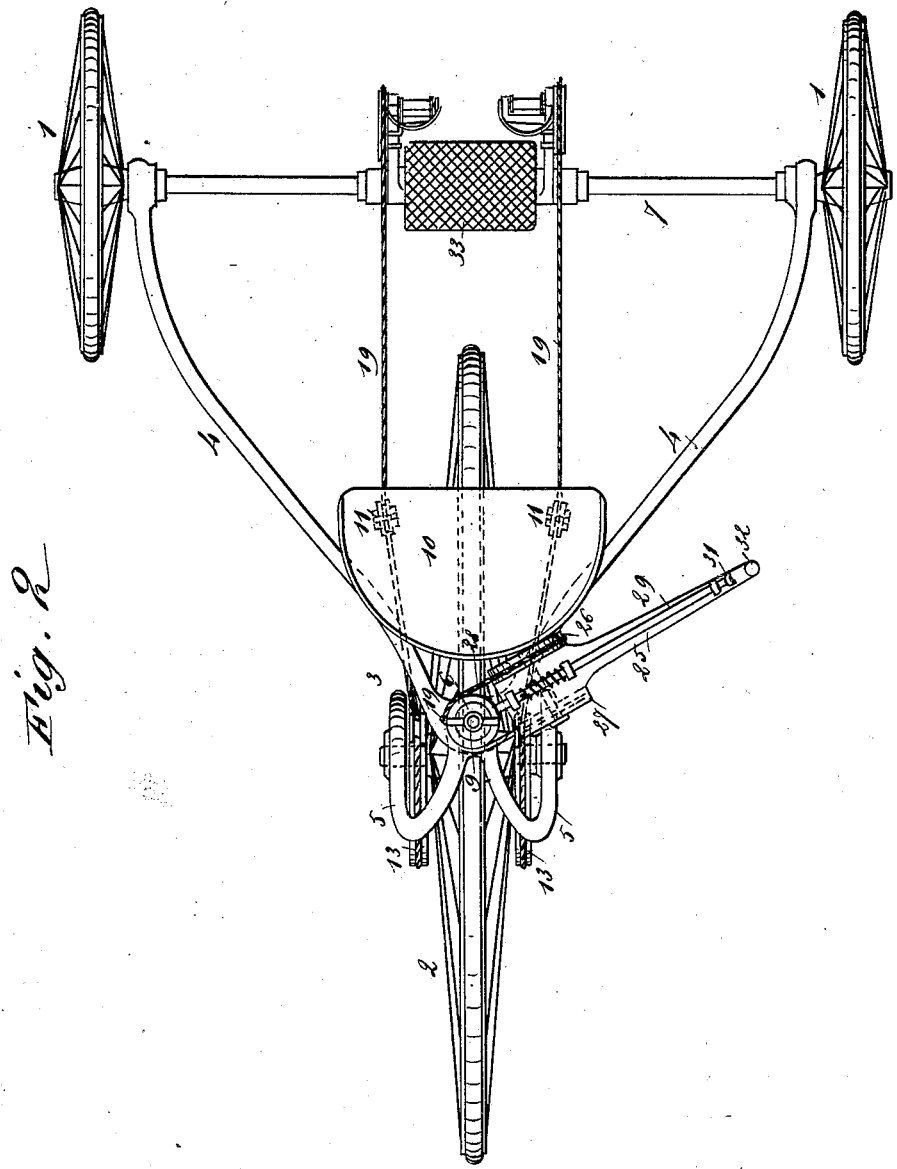
Figure 5:
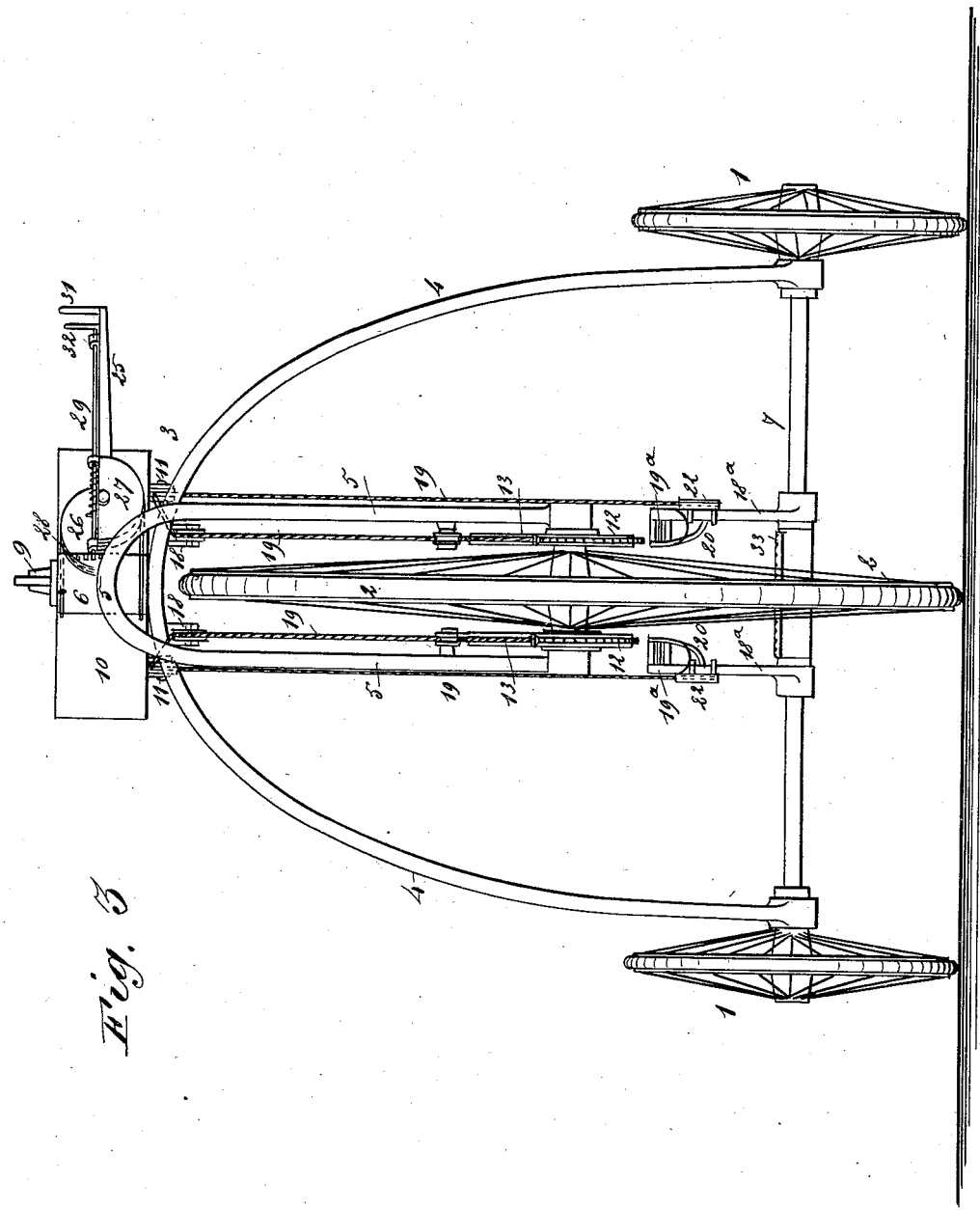

Figure 1 is a side elevation of the tricycle, and Fig. 2 a plan view thereof. Fig. 3 is a rear elevation, and Fig. 4 is a longitudinal vertical section through the segmental pulley attached to the axle of the main wheel. Fig. 5 is a central vertical section through the ratchet and segmental wheels illustrated in Fig. 4. Fig. 6 is a side elevation of the steering device, and Fig. 7 a plan view of the same. Fig. 8 is a front elevation of a treadle, and Fig. 9 a side elevation of the same.

In the construction of the tricycle two small wheels, 1, are employed, which constitute the front wheels, and one large wheel, 2, which is positioned at the rear.

The frame 3 consists of two parts—namely, the forward arched bars, 4, forming the backbone and upon which the seat is supported, and the vertical twin S-bars 5, adapted to extend upward over the large wheel 2 to a connection with the twin curved bars 4.

The lower ends of the bars 5, which present in side elevation the form of the letter S, constitute the bearings for the axle of the wheel 2. The upper ends of said bars at the top are curved toward each other above the wheel 2, and unite at an elevation over the wheel to form a vertical sleeve, 6. The lower ends of the arched bars 4 form the bearings for the axle 7 of the front wheels, 1, the said wheels being preferably attached to the axle outside the aforesaid bearings, as shown in Fig. 3. The upper ends of the said arched bars are merged in one, and provided with a vertical threaded lug, 8, adapted to enter the sleeve 6, where it is retained in pivotal position by a thumb-screw, 9, or similar device. The seat 10 is made to rest upon the forward arched bars, 4, in front of the sleeve 5 and a slight distance therefrom, as shown in Fig. 2, to the under portion of which seat, near the front, spaced and aligning pulleys 11 are attached, also shown in Fig. 1.

Upon the axle carrying the wheel 2, inside the bearings and in engagement with each side of the hub of the wheel, a ratchet-wheel, 12, is keyed, as shown in Fig. 5, and segmental rocking frames 13 are made to inclose the ratchet-wheels at the top, which frames are pivoted upon the aforesaid axle.

Each segmental frame 13 is provided with a pawl, 14, adapted when the frame is rocked in one direction to engage the ratchet-wheel and through the medium thereof drive the wheel 2 forward. As a means of restoring the frame 13 to its normal position immediately beside the ratchet-wheels, as shown in Fig. 4, a spring, 15, is coiled around the axle, having one end fastened thereto, and the other end to a downwardly-extending arm, 16, rigidly attached to the rock-frames 13, as illustrated in Figs. 4 and 5.

Upon the inner side of the S-bars 5 forwardly-projecting pulleys 17 are secured, and upon the under side of the arched bars 4, at their intersection and immediately below the sleeve 6, similar pulleys, 18, are attached, the purpose of which pulleys is to receive and guide ropes 19, one of which ropes is fastened to the outer peripheral surface of each rocking frame 13.

Upon the forward axle, 7, at each side of the center, treadle-arms 18$^a$ are held to turn, carrying at their upper ends, upon the inner side, the ordinary form of treadle, 19$^a$, which treadles are pivoted in said arms and in a bracket, 20, integral therewith, as shown in Fig. 8. A strap, 21, attached to the bracket 20 and the treadle-arms 18$^a$, extending in a semicircle to the rear of said treadles, is adapted to form a rest for the heel of the rider, who, positioned on the seat 10, operates the treadles with his feet.

To the outer side of each treadle-arm 18ᵃ segmental grooved blocks 22 are adjustably held, as illustrated in Fig. 9, by means of ways 23, integral with the inner side of the blocks, adapted to partially embrace the arms, a set-screw, 24, being provided to secure the blocks rigidly in a given position.

To the forward upper ends of each segmental block 22 the forward extremities of the guide-ropes 19 are securely fastened. Thus by the movement of the treadles through the medium of the ropes the large wheel 2 is rotated by the action of the segmental frames 13 and the ratchet-wheels 12.

As a means of guiding the tricycle, a lever, 25, is fulcrumed to the right-hand side of the seat, which lever is provided at one rear longitudinal edge with an integral upwardly-projecting segmental grooved lug, 26, and upon the opposite side with an integral downwardly-projecting segmental grooved lug, 27.

To the peripheral surface of each lug, adapted to rest in the groove therein, a cord or rope, 28, is attached at one end, the other end of the said cord or rope being adapted for attachment upon opposite sides of the sleeve 6 near the rear, as illustrated in Fig. 7.

It will be observed from the above construction of the guiding mechanism that when the lever is pulled upward the cord or rope is taken up by one segment and distributed by the other, so swinging the large wheel to the right, guiding the vehicle to the left. Depressing the lever reverses the above action.

To hold the vehicle in a nearly straight forward course, a spring-actuated sliding rod, 29, is held centrally and longitudinally the lever, the rear end of said rod being adapted to enter one of a series of apertures, 30, in the sleeve 6, as shown in Fig. 6, and the outer end of the rod is provided with a right-angular handle, 31, adapted to extend near the similar handle, 32, of the lever, so that both handles may be readily grasped with one hand.

When the lever 25 is to be raised or lowered, the rod 29 is simultaneously disengaged from the sleeve, and when the vehicle is brought upon the proper course the rod is released, and, again entering one of the apertures in the sleeve, holds the large wheel in position to go straight ahead.

Between the collars of the treadle-arms a plate, 33, is secured upon the axle, and upon the inner face of each collar, at the base, an outwardly-projecting lug, 34, is produced, adapted to engage the said plate and limit the throw of the treadle-arms.

The segmental frames 13 may be made of such a size that the cords 19 may be attached below the axes of said frames, whereby a longer reach may be afforded the treadles.

Having thus described my invention, what I claim as new, and desire to secure by Letters Patent, is—

1. A tricycle provided with one large rear driving-wheel, two small forward supporting-wheels, and a frame consisting of twin S-shaped rods forming bearings for the large wheel, and twin arched rods forming bearings for the small wheels, substantially as shown and described.

2. A tricycle provided with one large rear driving-wheel, two small forward supporting-wheels, and a frame consisting of twin S-shaped rods constituting journals for the large wheel, and twin arched rods constituting bearings for the small wheels, the said rods pivotally connected above the driving-wheel, substantially as shown and described.

3. In a tricycle, the combination, with the drive-wheel, ratchet wheels keyed upon the same axle with said drive-wheel, spring-actuated segmental frames adapted to reciprocate upon said axle, and a gripping device carried by said segmental frames, of treadle-carrying arms pivoted upon the axle of the supporting-wheels, segmental blocks attached to said treadle-arms, and a cord or rope connecting the said segmental frames and blocks, substantially as herein shown and described.

4. In a tricycle, the combination, with the drive-wheel, ratchet-wheels keyed upon the same axle with said drive-wheel, spring-actuated segmental frames adapted to reciprocate upon said axle, and a gripping device carried by said segmental frames, of treadle-carrying arms pivoted upon the axle of the supporting-wheels, provided with heel-rests, and segmental blocks attached thereto, a rope or cord connecting the said segmental blocks and frames, and means, substantially as shown, for turning the drive-wheel, substantially as herein shown and described.

GEORGE W. RODECAP.

Witnesses:
MILT. GRAY,
C. M. REED.